(12) United States Patent
Hauser et al.

(10) Patent No.: US 9,801,389 B2
(45) Date of Patent: Oct. 31, 2017

(54) COOKIE DOUGH TRAY

(71) Applicant: Progressive International Corporation, Kent, WA (US)

(72) Inventors: Lawrence M. Hauser, Auburn, WA (US); Jeffery David Madden, New Brunswick (CA)

(73) Assignee: PROGRESSIVE INTERNATIONAL CORPORATION, Kent, WA (US)

( * ) Notice: Subject to any disclaimer, the term of this patent is extended or adjusted under 35 U.S.C. 154(b) by 554 days.

(21) Appl. No.: 14/060,968

(22) Filed: Oct. 23, 2013

(65) Prior Publication Data

US 2014/0116264 A1     May 1, 2014

Related U.S. Application Data

(60) Provisional application No. 61/718,390, filed on Oct. 25, 2012.

(51) Int. Cl.
| | |
|---|---|
| *A47J 37/00* | (2006.01) |
| *A47J 36/34* | (2006.01) |
| *A47J 43/20* | (2006.01) |
| *A21B 3/13* | (2006.01) |

(52) U.S. Cl.
CPC .............. *A21B 3/132* (2013.01); *A21B 3/138* (2013.01); *F25D 2331/807* (2013.01)

(58) Field of Classification Search
CPC .......... A47J 37/108; A47J 36/34; A47J 43/20; A21B 3/132; A21B 3/134
USPC ................. 99/439, 428, 432, 353, 449, 448; 249/144, 163
See application file for complete search history.

(56) References Cited

U.S. PATENT DOCUMENTS

| | | | | |
|---|---|---|---|---|
| 3,296,956 | A * | 1/1967 | Turner | 99/439 |
| 4,220,134 | A * | 9/1980 | Snyder | 126/390.1 |
| 4,446,982 | A * | 5/1984 | Corse | 220/8 |
| 5,191,830 | A * | 3/1993 | Jacobson | 99/439 |
| 5,400,698 | A * | 3/1995 | Savage | 99/439 |
| 5,425,527 | A * | 6/1995 | Selbak | 249/122 |
| 5,988,045 | A * | 11/1999 | Housley | 99/339 |
| 6,327,968 | B1 * | 12/2001 | Scannell | 99/353 |
| 7,150,221 | B2 * | 12/2006 | Morgan | 99/428 |
| 2004/0094043 | A1 * | 5/2004 | Morgan | 99/426 |
| 2008/0314259 | A1 * | 12/2008 | Broom | 99/426 |

* cited by examiner

*Primary Examiner* — Michael Laflame, Jr.
(74) *Attorney, Agent, or Firm* — Lowe Graham Jones PLLC

(57) ABSTRACT

A cookie dough tray is formed with a substantially rigid frame having a plurality of cavities formed from an elastomeric material, each of the cavities being sized to accommodate dough for a single cookie. The cavities may include a convex bottom portion to facilitate inversion of the cavities for removal of the dough.

17 Claims, 4 Drawing Sheets

COOKIE DOUGH TRAY

PRIORITY CLAIM

This application claims the benefit of prior U.S. provisional application Ser. No. 61/718,390 filed Oct. 25, 2012, the contents of which are incorporated by reference.

FIELD OF THE INVENTION

This invention relates to trays for storing cookie dough, particularly as formed into individual cookie portions for storage and subsequent baking.

BACKGROUND OF THE INVENTION

Cookie dough stores well when frozen, but in its frozen state it is extremely difficult to separate the dough into individual cookie-sized portions. Typically, frozen dough must either be thawed before using, or must be frozen in a cylindrical shape that allows it to be cut in frozen form. It is possible to freeze and store the dough in individual portions, but such frozen dough tends to stick to the container, and separate portions tend to stick to one another.

SUMMARY OF THE INVENTION

A preferred cookie dough tray is formed with a plurality of cavities, each of the cavities being sized to accommodate dough for a single cookie. In a preferred version of the invention, the tray is substantially rigid and contains six cookie cavities. In other versions the tray includes twelve cavities or more.

The cavities are formed from a soft, flexible material allowing a user to press against an outer surface of the cavity, at least partially inverting the cavity to separate the dough from the cavity.

In a preferred version, the cavities are configured as a unitary resilient portion forming several cavities that are joined together. The resilient portion is attached to a relatively more rigid tray which, in a preferred implementation is formed from a different material than the material forming the unitary resilient portion and the cavities.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
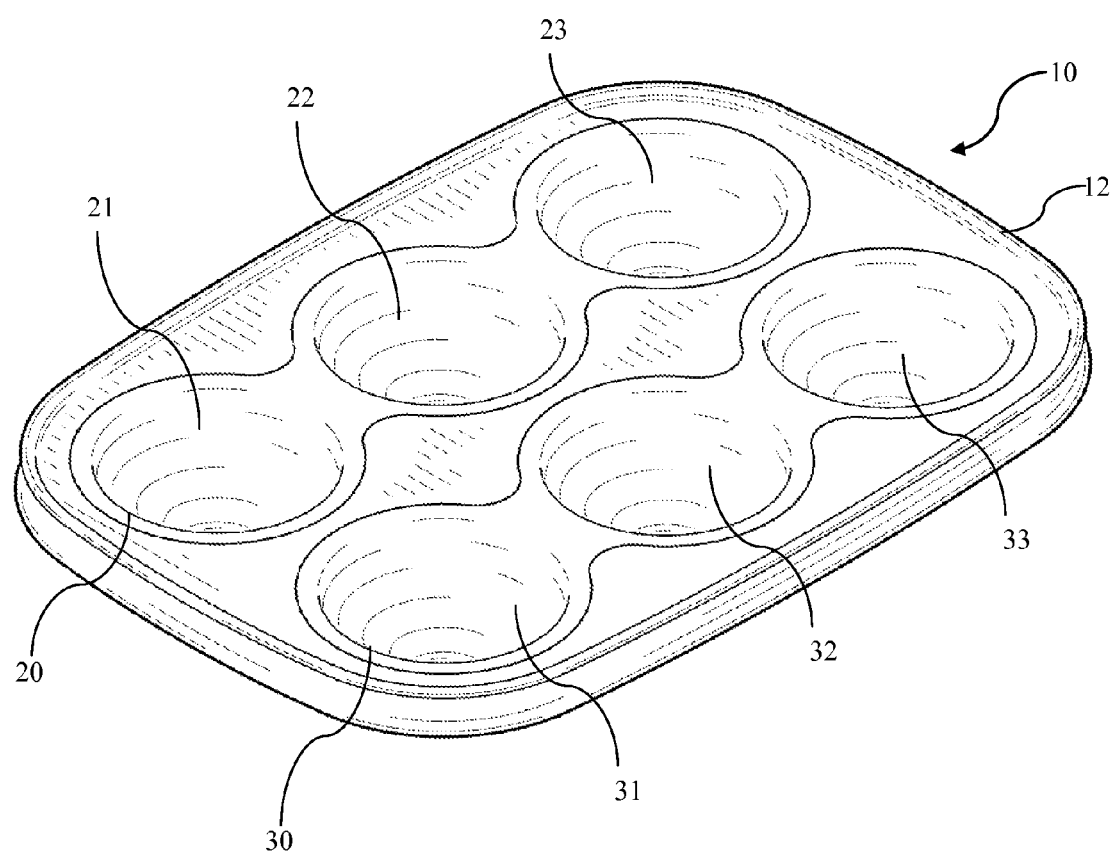
FIG. 1 is a top perspective view of a preferred cookie dough tray.
Figure 2:
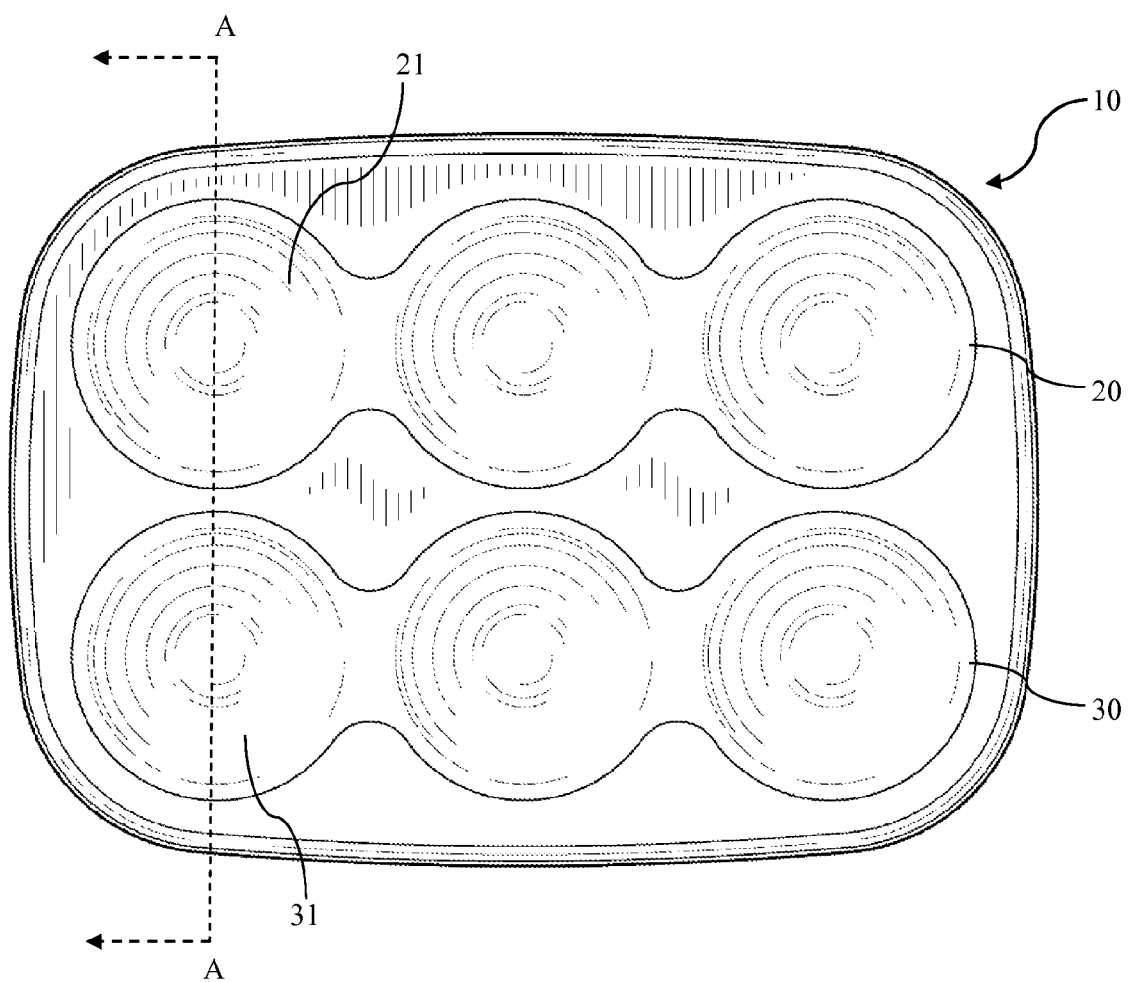
FIG. 2 is a top view of a preferred cookie dough tray.

As illustrated in FIG. 1, a preferred cookie dough tray 10 includes a rigid or semi-rigid upper frame 12. The frame preferably is formed with a raised rim surrounding a substantially planar central surface area bounded by the raised rim. The rim in the preferred version of the invention extends above the planar surface and further continues below the planar surface for added rigidity and strength. In the illustrated version, several bowls or cavities 31, 32, 33 are provided for receiving portions of cookie dough, with the cavities organized in multiple rows or sections 20, 30.

Figure 5:
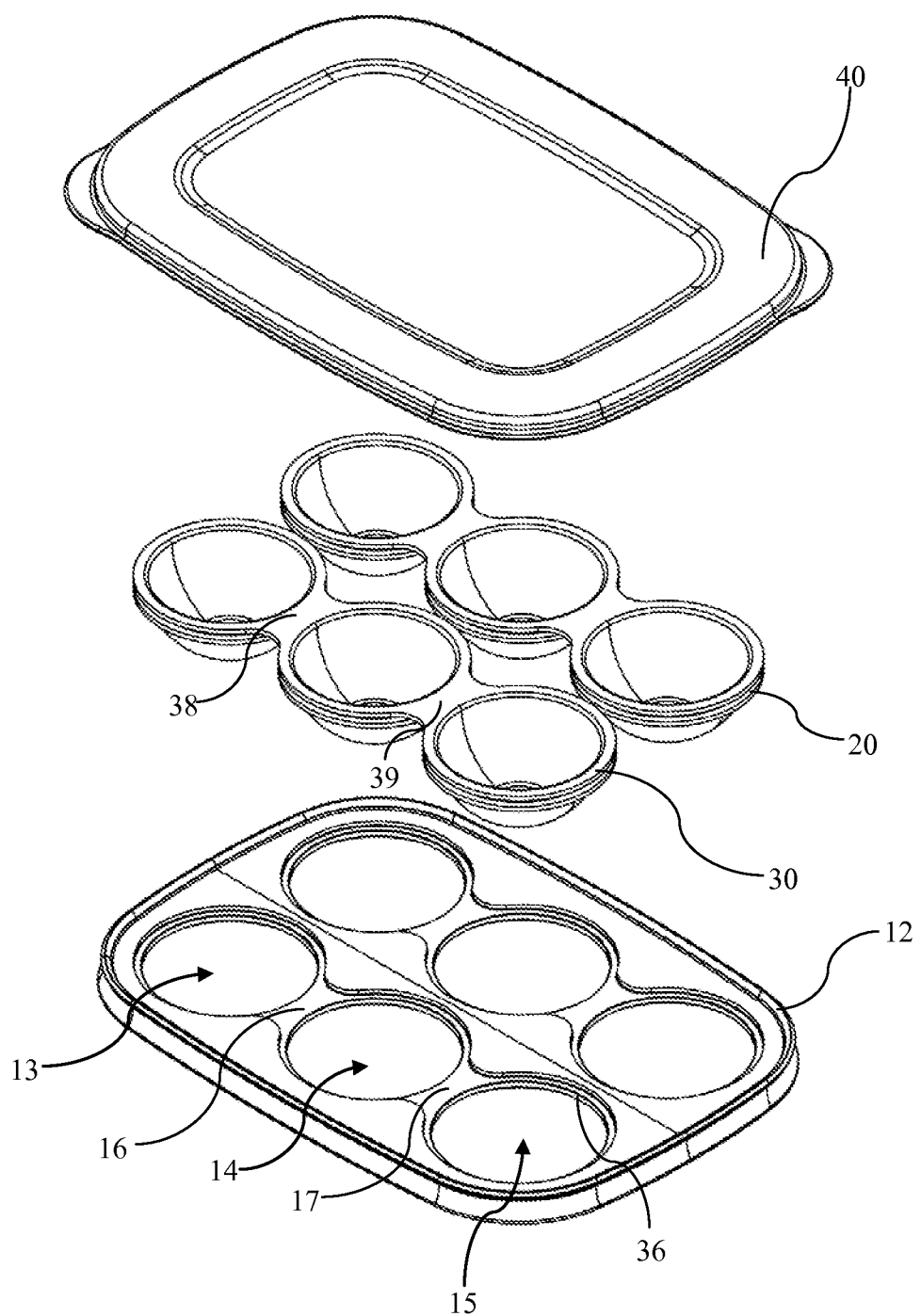
FIG. 5 is an exploded view of a preferred cookie dough tray.

As best seen in the exploded view of FIG. 5, in one version of the invention the tray is configured as a separate rigid frame 12 formed from a first material and having openings configured to receive bowls formed from a second material that is relatively more resilient than the first material. Most preferably, the tray frame is formed from ABS, but other rigid or semi-rigid materials may be used instead. In one version, the bowls or cavities are formed from an elastomeric material such as a TPE, silicone or other resilient materials.

In the version of FIG. 5, within the central planar portion of the frame 12 several openings 13, 14, 15 are formed, and in the preferred version of the invention six such openings are provided. Each of the openings serves as a location for a resilient material forming a bowl or cavity, such as cavities 31, 32, 33 as illustrated in FIG. 1. The interior space of each bowl serves as a cavity configured to receive cookie dough which, in the preferred version, is of a sufficient size to form a single cookie.

In the illustrated example, the tray 10 includes a total of six openings, formed in two rows of three. Thus, in a first row three openings 13, 14, 15 are formed in the tray. Each of the openings is further shaped to include a peripheral rim formed as a short vertical portion and an inward-protruding horizontal flange. A recessed region is provided between adjacent openings to provide a seat for resilient material, as described below. As best seen in FIG. 5, a recessed region 16 is formed in the tray between first and second openings 13, 14, and another recessed region 17 is formed between the second and third openings 14, 15.

In one version, the resilient material forming the cavities is likewise formed in two unitary pieces 20, 30, each forming a total of three separate cavities. Thus, in one example a first resilient cavity portion 30 is created to form a first group of three cavities 31, 32, 33 while a second resilient cavity portion 20 is created to form a second group of three cavities 21, 22, 23. In other versions of invention, the resilient cavity portions may be formed to define a larger or smaller number of separate cavities.

Figure 3:
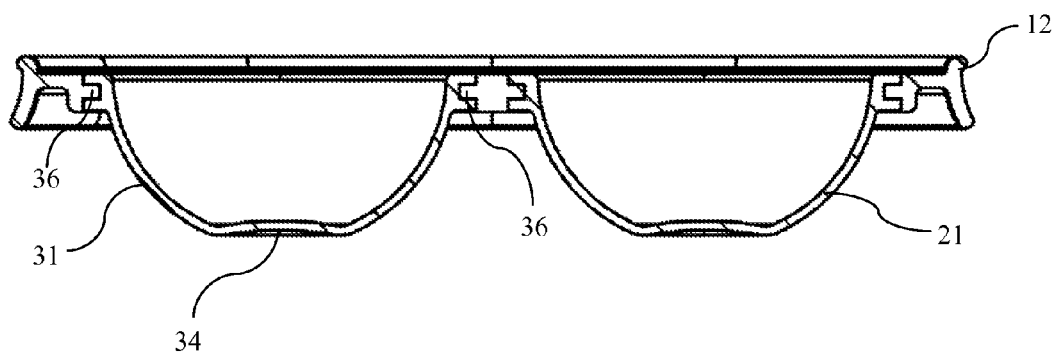
FIG. 3 is a sectional view of a preferred cookie dough tray, taken along line A-A in FIG. 2.

The illustrated versions of the resilient cavity portions are formed with sidewalls that extend downwardly from the top of the planar tray, curving continuously downwardly and inwardly until they reach the cavity floor 34, as shown in FIG. 3. In one version, the sidewalls are continuously curved to define a hemispherical shape. In another example, a portion of the floor of the cavity is shaped to be flat or planar. In the illustrated version, a portion of the cavity floor is formed with a convex shape or a slightly raised dome shape. In such a version, cookie dough is less likely to stick to the bottom of the cavity and releases more freely when a user presses inwardly against an outside portion of the cavity floor. By forming the convex bottom portion within the resilient bowl, the resilient bowl is more readily able to fold upon itself under a force exerted against the bottom of the bowl and toward the frame.

As shown, in a version in which the cavity portion is formed to define three separate cavities, most preferably a substantially flat connector portion 38, 39 is provided between adjacent cavities 31, 32, 33. The connector portions are sized to be snugly received within the recessed portions 16, 17 formed in the planar portion of the rigid tray 12.

Accordingly, combined recessed portions and connector portions serve to improve the adhesion between the cavity portion and the tray.

Figure 4:
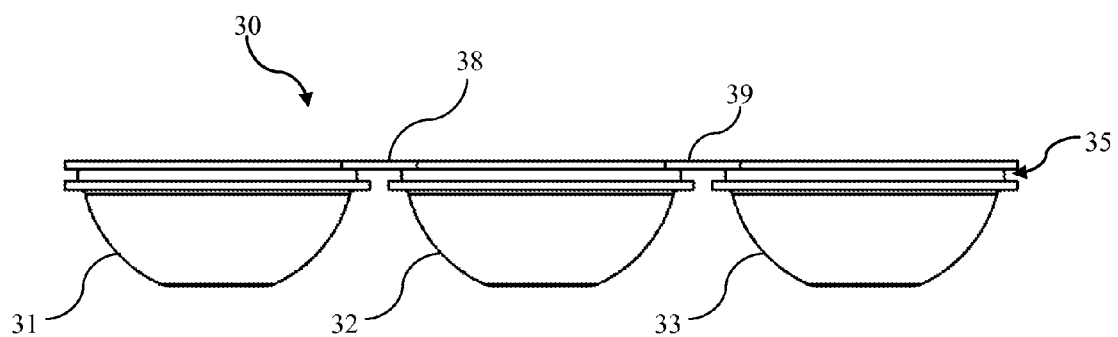
FIG. 4 is a side view of a unitary resilient portion of a preferred cookie dough tray.

At an upper rim along the perimeter of the cavity portion, an inward channel 35 is formed, as best seen in FIG. 4. The channel is sized and configured to surround the flange 36 (see FIGS. 3 and 5) formed in the rigid tray 12, within the rim defining each of the openings. Together, the flange and channel cooperate to provide a surface area for adhering the cavity portion to the tray. In addition, as described above, the connector portions 38, 39 adhere to the surface of the tray and provide a larger surface area for a stronger attachment of the resilient portions and the tray.

Optionally, the cookie dough tray may further include a lid 40 sized and shaped to enclose the top portion of the tray. Most preferably, the combination of the peripheral rim formed on the tray and the configuration of the lid serve to raise the inside portion of the lid slightly above the top surface of the cavity portion.

In use, cookie dough is placed within each of the cavities formed in the cavity portion. The cookie dough tray is then stored, either in a refrigerator or freezer. In order to bake cookies from the frozen cookie dough, a user presses upwardly against the floor of a cavity such that the upward force at least partially inverts the cavity and urges the cookie dough from the cavity. Most preferably, the cavity portions are formed from a resilient material such as TPE or silicone which includes nonstick properties. This further facilitates the release of the cookie dough from the cavity. Once released, the dough may be baked in frozen form or may be thawed before baking.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A cookie dough tray, comprising:
   a frame having a peripheral rim and a planar interior region bounded by the peripheral rim, the planar interior region forming a plurality of openings defining holes extending fully through the tray, the frame including the peripheral rim and the planar interior region being formed from a first material whereby the frame is rigid or semi-rigid;
   a first recessed portion formed in the planar interior region, the first recessed portion extending between the plurality of openings;
   a plurality of bowls supported by the frame, each separate one of the plurality of bowls being positioned within a separate one of the plurality of openings, each of the plurality of bowls being integrally formed from a second material, the second material being an elastomeric material and further being a different material than the first material;
   the plurality of bowls further being formed as a unitary resilient portion having a first bowl, a second bowl, and an integral connector portion joining the first bowl to the second bowl, each of the first bowl, the second bowl, and the integral connector portion being integrally formed from the second material, the integral connector portion being received within the first recessed portion; wherein each of the plurality of bowls is at least partially invertible by a force applied by a user against a bottom of the bowls.

2. The cookie dough tray of claim 1, wherein the first bowl further comprises a bottom, the bottom having a convex shape.

3. The cookie dough tray of claim 2, wherein each of the plurality of openings further comprise a peripheral flange extending inward toward an interior of the opening, the unitary resilient portion being attached to the flange.

4. The cookie dough tray of claim 3, wherein the unitary resilient portion further comprises a peripheral channel, the flange being received within the channel.

5. The cookie dough tray of claim 4, further comprising a lid configured to be removably attached to the rim, whereby the bowls are covered by the lid when the lid is attached to the rim.

6. The cookie dough tray of claim 1, wherein the plurality of bowls are formed as a unitary resilient portion further comprise a third bowl and a second integral connector portion joining the second bowl to the third bowl, each of the first bowl, second bowl, third bowl, first integral connector and second integral connector portion being integrally formed from the second material.

7. The cookie dough tray of claim 6, further comprising a second recessed portion formed in the planar interior region, the second recessed portion extending between the second opening and a third opening from the plurality of openings, the second integral connector portion being received within the second recessed portion.

8. A cookie dough tray, comprising:
   a frame having a peripheral rim and forming a plurality of openings extending through an interior region bounded by the peripheral rim, the frame being formed from a first material whereby the frame is rigid or semi-rigid;
   a first unitary resilient portion forming a first plurality of bowls, the first unitary resilient portion being supported by the frame, each separate one of the first plurality of bowls being positioned within a separate one of the plurality of openings;
   a second unitary resilient portion forming a second plurality of bowls, the second unitary resilient portion being supported by the frame, each separate one of the second plurality of bowls being positioned within a separate one of the plurality of openings;
   the first unitary resilient portion and the second unitary resilient portion each being integrally formed from a second material, the second material being an elastomeric material and further being a different material than the first material.

9. The cookie dough tray of claim 8, wherein each of the first and second pluralities of bowls further comprises a bottom, the bottom having a convex shape.

10. The cookie dough tray of claim 8, wherein the frame further comprises an interior region bounded by the rim, the interior region being planar.

11. The cookie dough tray of claim 10, further comprising at least one recessed portion formed in the planar interior region, the recessed portion receiving a portion of the first unitary resilient portion to retain the first unitary resilient portion with the frame.

12. The cookie dough tray of claim 8, further comprising a lid configured to be removably attached to the rim, whereby the bowls are covered by the lid when the lid is attached to the rim.

13. A cookie dough tray, comprising:
   a peripheral rim bounding an interior region, the interior region having a plurality of openings formed as holes extending fully through the interior region, the peripheral rim and the interior region being formed from a first material whereby the peripheral rim and the interior region is rigid or semi-rigid;

a first unitary resilient portion forming a first plurality of bowls, the first unitary resilient portion being spaced apart from the peripheral rim and supported by the interior region, each separate one of the first plurality of bowls being positioned within a separate one of the plurality of openings;

a second unitary resilient portion forming a second plurality of bowls, the second unitary resilient portion being spaced apart from the peripheral rim and supported by the interior region, each separate one of the second plurality of bowls being positioned within a separate one of the plurality of openings;

the first unitary resilient portion and the second unitary resilient portion each being integrally formed from a second material, the second material being an elastomeric material and further being a different material than the first material.

14. The cookie dough tray of claim 13, wherein each of the first and second pluralities of bowls further comprises a bottom, the bottom having a convex shape.

15. The cookie dough tray of claim 13, wherein the interior region is planar.

16. The cookie dough tray of claim 15, further comprising at least one recessed portion formed in the planar interior region, the recessed portion extending from a first one of the openings to a second one of the openings, the recessed portion receiving a portion of the first unitary resilient portion to retain the first unitary resilient portion with the frame.

17. The cookie dough tray of claim 13, further comprising a lid configured to be removably attached to the rim, whereby the bowls are covered by the lid when the lid is attached to the peripheral rim.

* * * * *